United States Patent
Minamitani et al.

(10) Patent No.: US 6,808,014 B2
(45) Date of Patent: Oct. 26, 2004

(54) COOLING DEVICE OF ELECTRONIC APPARATUS

(75) Inventors: Rintaro Minamitani, Tsukuba (JP); Shigeo Ohashi, Tsuchiura (JP); Yoshihiro Kondo, Tsuchiura (JP); Yuji Yoshitomi, Chiyoda (JP); Takashi Naganawa, Chiyoda (JP); Masato Nakanishi, Chiyoda (JP); Tsuyoshi Nakagawa, Hadano (JP)

(73) Assignee: Hitachi, Ltd, Tokyo (JP)

( * ) Notice: Subject to any disclaimer, the term of this patent is extended or adjusted under 35 U.S.C. 154(b) by 0 days.

(21) Appl. No.: 10/426,719

(22) Filed: May 1, 2003

(65) Prior Publication Data

US 2004/0035557 A1 Feb. 26, 2004

(30) Foreign Application Priority Data

Jul. 15, 2002 (JP) ........................................ 2002-204977

(51) Int. Cl.⁷ .......................... F28F 7/00; F28D 15/00; H05K 7/20
(52) U.S. Cl. ................................ 165/80.4; 165/104.33; 361/699; 361/687
(58) Field of Search ........................... 165/104.33, 80.3, 165/80.4, 185; 361/687, 695, 698, 699, 701; 257/714; 174/15.1, 16.3

(56) References Cited

U.S. PATENT DOCUMENTS

| | | | | |
|---|---|---|---|---|
| 5,285,347 A | * | 2/1994 | Fox et al. | 361/699 |
| 5,309,319 A | * | 5/1994 | Messina | 361/699 |
| 5,646,824 A | * | 7/1997 | Ohashi et al. | 361/699 |
| 6,166,907 A | * | 12/2000 | Chien | 361/699 |
| 6,510,052 B2 | * | 1/2003 | Ishikawa et al. | 361/687 |
| 6,611,425 B2 | * | 8/2003 | Ohashi et al. | 361/687 |

FOREIGN PATENT DOCUMENTS

| | | | | |
|---|---|---|---|---|
| JP | 64-84699 A | | 3/1989 | |
| JP | 2-244748 A | | 9/1990 | |
| JP | 03192798 A | * | 8/1991 | ............ H05K/7/14 |
| JP | 5-335454 A | | 12/1993 | |
| JP | 6-97338 A | | 4/1994 | |
| JP | 6-125188 A | | 5/1994 | |
| JP | 6-266474 A | | 9/1994 | |
| JP | 7-142886 A | | 6/1995 | |

* cited by examiner

Primary Examiner—Henry Bennett
Assistant Examiner—Tho Duong
(74) Attorney, Agent, or Firm—Antonelli, Terry, Stout & Kraus, LLP

(57) ABSTRACT

A cooling device for an electronic apparatus, comprising: a heat generating element attached within a first housing; a heat receiving jacket, being connected with said heat generating element, and being attached within said first housing; a second housing being rotatably supported on said first housing; a first heat exchanger attached within said second housing, for exchanging heat between an outside; and a liquid driving means for supplying a cooling liquid to said heat receiving jacket, wherein a portion of a pipe for connecting between said heat receiving means, said first heat exchanger, and said liquid driving means is made of a flexible tube made of a resin, and further wherein, a second heat exchanger and an ion exchanger are provided in a part of said pipe, said second housing is received within said second housing, and said ion exchanger is received within said second housing.

5 Claims, 4 Drawing Sheets

COOLING DEVICE OF ELECTRONIC APPARATUS

BACKGROUND OF THE INVENTION

The present invention relates to a cooling device of an electronic apparatus with using a liquid as a cooling means for heat-generating parts thereof.

An electronic apparatus, such as a computer, for example, generates heat when it operates.

In particular, heat generation of highly integrated semiconductor device rises up in an amount thereof, in recent years. However, since the semiconductor device will loose the function as it is, when exceeding a certain temperature, therefore it is necessary to conduct cooling thereon effectively.

As a means for cooling the semiconductor device in the electronic apparatus, those are already known, such as, a natural cooling system through a phenomenon, the heat conduction, a compulsive air cooling system by means of a fan, or a liquid cooling system with using a heat pipe therein, for example.

In the natural cooling system, the cooling is achieved by using a material having a large heat conductivity within a heat radiation path reaching from the semiconductor device to an outside of the electronic apparatus.

This method is suitable for use in the semiconductor device having a relatively small amount of heat generation, or for the electronic apparatus, being compact in the size, such as, a personal computer of note-type or the like, for example.

In the compulsive air cooling system by means of a fan, etc., the air-blowing device is provided within the electronic apparatus, thereby generating the convection, compulsively, for cooling the semiconductor device provided therein.

Since being suitable for use in cooling of the semiconductor, which has an amount of heat generation up to a certain degree thereof, this method is widely used, in general, and is also applied into a personal computer with making the air-blowing device small in the sizes and thin in the thickness thereof.

In the cooling of using the heat pipe therein, the heat of the semiconductor element is transferred by the function of coolant, which is enclosed within a pipe.

The conventional technology of using such the heat pipe is described, for example, in Japanese Patent Laying-Open No. Hei 1-84699 (JP-A 84699 (1989)) and Japanese Patent Laying-Open No. Hei 2-244748 (JP-A 244748 (1990)).

With those conventional technologies, though being extremely high in the effect of saving electric power since there is used no portion, consuming the electric power therein, however there is a limit an amount of heat, which can be transmitted therewith.

Now, a technology is practiced, conventionally, cooling the semiconductor device generating heat through circulation of a liquid coolant thereto; thus, water, by means of a pump, etc., for example. Such the cooling means is applied into a large-scale computer dealing a large amount of data, for use in a bank and/or a company, etc., for example.

For this conventional technology, relating to a cooling method by means of the liquid coolant, the following can be listed up; Japanese Patent Laying-Open No. Hei 5-335454 (JP-A 335454 (1993)), Japanese Patent Laying-Open No. Hei 6-97338 (JP-A 97338 (1993)), and Japanese Patent Laying-Open No. Hei 6-125188 (JP-A 125188 (1994)), for example.

However, those conventional technologies are limited to the large-scale computer, in uses thereof.

The reason of this lies in that the apparatus as a whole comes to be large in the sizes since the liquid cooling system needs a large number of parts for exclusive use of cooling, such as a pump, a piping system, a heat exchanger(s), etc., and that it is difficult to ascertain a reliability for safety, comparing to other methods, due to use of the liquid for the purpose of cooling.

Also, one of the other reasons lies in the fact that the semiconductor device, having such large heat generation that it needs the liquid cooling, is not used, but only in the large-scaled computer.

As the conventional arts, applying such the liquid-cooling technology for the large-scale computer into a small size electronic apparatus (such as, the note-type personal computer), the followings can be listed up, for example, Japanese Patent Laying-Open No. Hei 6-266474 (JP-A 266474 (1994)), and Japanese Patent Laying-Open No. Hei 7-142886 (JP-A 142886 (1995)).

In such the conventional arts, which are described in the Japanese Patent Laying-Open No. Hei 7-142886 (JP-A 142886 (1995)) and the Japanese Patent Laying-Open No. Hei 6-266474 (JP-A 266474 (1994)), an improvement is made on the reliability, in particular with respect to the heat conductivity and the liquid leakage, by applying a heat receiving jacket, a heat radiation tube and a metal heat exchanger therein. However, in those conventional arts, the heat receiving jacket and the heat radiation tube are made of metal, by taking the heat conductivity thereof into the consideration.

On a while, the heat receiving jacket is preferable in a plate-type, from the consideration of the heat conductivity thereof, therefore it is necessary to form flow passages made up with a minute fin structure in the heat-receiving jacket of such the plate-type. The minute fin structure of the heat receiving jacket can be manufactured with relative ease.

Accordingly, for such the plate-type heat receiving jacket, aluminum is preferable to form, from the viewpoints, such as, the heat transfer performance, the cost and the processability thereof, while a copper pipe is preferable for the heat radiation pipe and the heat exchanger from the viewpoints, such as, the heat transfer performance, the cost and the processability thereof.

However, when adopting a combination of the heat receiving jacket made of aluminum, the heat radiation pipe and the heat exchanger, both made of copper, being preferable from the viewpoints, such as, the heat transfer performance, the cost and the processability, then there is a problem that the localized corrosion (or pitting corrosion, crevice corrosion) of the aluminum is accelerated remarkably, due to copper ion dissolved from the copper.

Also, from a tube made of a polymeric material group, which is adopted to be a connector tube, corrosive ion is dissolved, including halogen ion therein, for example; therefore, the localized corrosion is further accelerated, remarkably.

BRIEF SUMMARY OF THE INVENTION

An object, according to the present invention, is to provide an electronic apparatus, with which an improvement can be obtained on reliability, in particular when being mounted with a cooling device combining the copper and the aluminum.

For accomplishing the object mentioned above, according to the present invention, firstly, there is provided a cooling device for an electronic apparatus, comprising: a heat generating element attached within a housing; a heat receiving jacket, being connected with said heat generating element; a first heat exchanger for exchanging heat between an outside; and a liquid driving means for supplying a liquid to said heat receiving jacket, wherein a part of pipework connecting between said heat receiving means, said first heat exchanger, and said liquid driving means is made from a flexible tube of resin, and further comprising, a second heat exchanger and an ion exchanger, which are provided in a part of said pipework.

Also, according to the present invention, in the cooling device for an electronic apparatus, as described in the above, wherein said ion exchanger absorbs therein a corrosion inhibitor in advance, and said cooling liquid is added with a corrosion inhibitor therein.

And, also according to the present invention, in the cooling device for an electronic apparatus, as described in the above, wherein said heat receiving jacket is made of an aluminum group material, said second heat exchanger is made of a copper group material, said liquid medium is an anti-freezing liquid or a pure water, and into said cooling liquid is added a corrosion inhibitor for the copper group material.

Further, according to the present invention, for also achieving the object mentioned above, there is also provided a cooling device for an electronic apparatus, comprising: a heat generating element attached within a first housing; a heat receiving jacket, being connected with said heat generating element, and being attached within said first housing; a second housing being rotatably supported on said first housing; a first heat exchanger attached within said second housing, for exchanging heat between an outside; and a liquid driving means for supplying a cooling liquid to said heat receiving jacket, wherein a portion of a pipe for connecting between said heat receiving means, said first heat exchanger, and said liquid driving means is made of a flexible tube made of a resin, and further wherein, a second heat exchanger and an ion exchanger are provided in a part of said pipe, said second housing is received within said second housing, and said ion exchanger is received within said second housing.

Also, according to the present invention, in the cooling device for an electronic apparatus, as described in the above, wherein said second heat exchanger is cooled by means of a fan.

And also, according to the present invention, in the cooling device for an electronic apparatus, as described in the above, wherein said ion exchanger absorbs therein a corrosion inhibitor in advance, and said cooling liquid is added with a corrosion inhibitor therein.

Furthermore, according to the present invention, in the cooling device for an electronic apparatus, as described in the above, wherein a display device made from a liquid crystal panel is provided in said second housing, and said ion exchanger is provided on a reverse side surface of said liquid crystal panel.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE INVENTION

Figure 1:
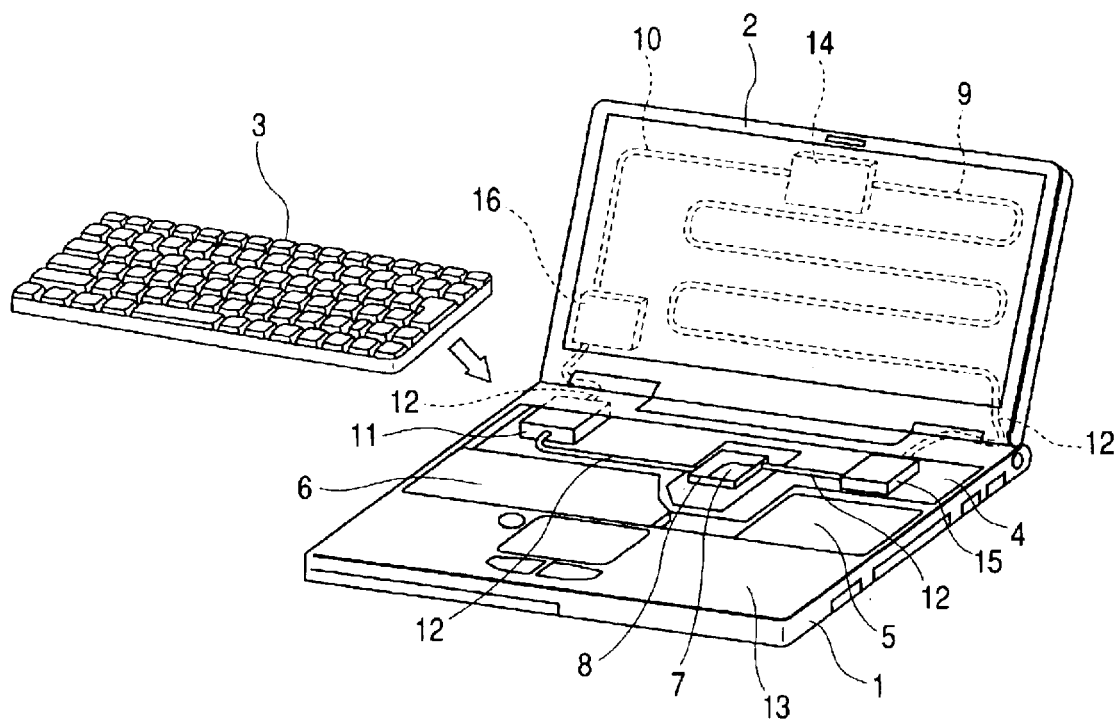
FIG. 1 is a perspective view of a first embodiment, according to the present invention.

In recent years, an increase jumps up high in heat generation of the semiconductor devices, accompanying with a large-capacity and a large-scale of electronic apparatuses, such as, a personal computer, a server, a workstation, as well as, a plasma display (PDP), a television, a liquid crystal display, etc.

Since it is insufficient to cool down the semiconductor devices, being high in the heat generation in such the manner, in the cooling capacity thereof, by means of the cooling means, such as, the heat conduction, the air-cooling, the heat pipe, etc., studying is made on mounting of a cooling device onto those electronic apparatuses, which circulates the cooling liquid mentioned above therein.

In particular, for application thereof into the electronic apparatus, being required to be extremely small in the sizes and thin in the thickness, such as, the personal computer of note-type, further technical innovation is needed. Accordingly, the inventors of the present invention try to bring a housing of the electronic apparatus to be made of metal, being satisfactory in the heat conductivity, etc., thereby enabling mounting of the liquid cooling system onto such the note-type electronic apparatus.

Then, when mounting the liquid cooling system onto the note-type electronic apparatus at present state (for example, A4 size, class 30W), it is possible to obtain a satisfactory effect on heat radiation thereof. However, there is very high possibility in future, that an electronic apparatus will be developed, which exceeds 30W in the class, therefore it will be necessary to use the liquid cooling system together with the fan cooling system in common (thus, so-called "hybrid"). In such the case, a second heat exchanger for use in heat radiation will be necessary other than the heat radiation pipe.

In general, since the heat exchanger uses a copper pipe therein, it is known that the following harmful effect will occur when the heat receiving portion of aluminum is used together with the heat exchanger of copper in common.

Namely, for the purpose of adopting the liquid cooling system, which has been used in the conventional large-scale computer, into the electronic apparatus, to be extremely small in the sizes and thin in the thickness, it is a necessary condition that the liquid cooling system itself be extremely small in the sizes and thin in the thickness. For this reason, in the liquid cooling system for use in such the small-size and thin-thickness electronic apparatus, an amount of the cooling liquid or coolant comes down to be remarkably small, i.e., 1/10,000, comparing to that in the large scale computer, so that the liquid quality can be degraded remarkably if dissolution occurs on corrosive ion even in a small amount thereof. And, if such the liquid degraded in the quality thereof circulates within the heat receiving jacket, the heat radiation pipe and/or the heat exchanger, the corrosion is accelerated at the metal portion thereof, and there is provability that the liquid leakage occurs from the corroded portion, thereby causing electric accident. Accordingly, it is necessary to take anticorrosive measure on the members in contact with the liquid, in particular, the materials thereof.

Then, according to the present invention, as a result of various studies made about the anticorrosive measures, the following embodiments can be obtained.

Hereinafter, one embodiment according to the present invention will be explained, by referring to FIGS. 1 and 2.

FIG. 1 is a perspective view of an electronic apparatus according to the present invention.

Figure 2:
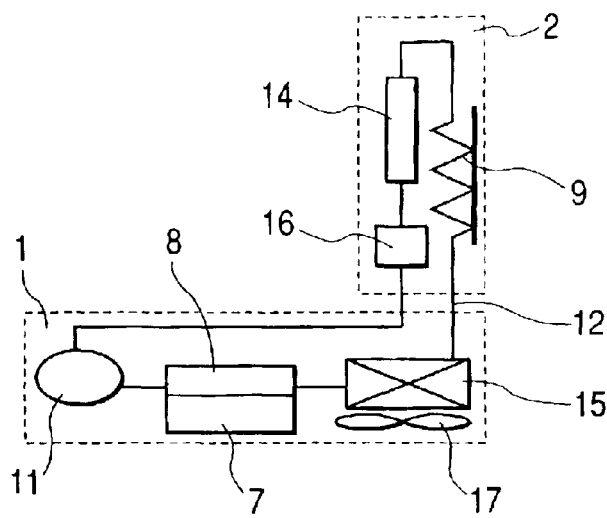
FIG. 2 is a block diagram of the first embodiment, according to the present invention.

FIG. 2 is a diagram of a cooling system mounted within the electronic apparatus.

In FIGS. 1 and 2, the electronic apparatus comprises a main-body case or housing 1 and a display case or housing 2, which has a display built up with a liquid crystal panel. This display case 2 is connected to the main-body case 1 through a hinge (not shown in the figures), being freely rotatable.

In the main-body case 1 are provided a key board 3, a printed circuit board 4 mounting plural numbers of electronic devices thereon, a hard disc drive 5, an external memory device(s) (such as, a floppy disc drive and/or a CD drive, etc.) 6, a battery 13, and soon. On the printed circuit board 4 is mounted, in particular, an electronic device having a large amount of heat generation, such as, a central processing unit 7 (hereinafter, being described by "CPU"), for example. On the CPU 7 is attached a heat receiving jacket 8. The CPU 7 and the heat receiving jacket 8 are connected with each other through a soft heat-conductive material (for example, a mixture of heat-conductive filler, such as, aluminum oxide, into silicon rubber).

On a rear surface of the display case 2 (i.e., in an inside of the case), a heat radiation plate 10 made of metal is provide, on which is connected a heat radiation pipe 9. In an upper portion of the rear surface of the display case 2 is provided a tank 14, which is connected to the heat radiation pipe 9. The tank 14 has such a capacity that it can keep an amount of cooling liquid necessary for obtaining cooling within the circulating passage even if the coolant comes down due to the permeation of liquid from the structural materials and the sealing materials thereof.

Also, a pump 11, as a liquid driving means, and a heat exchanger 15, for conducting heat exchange between an outside, are provide within the main-body case 1. Though the heat exchanger 15 achieves heat exchange between the outside, in the similar manner to that of the heat radiation pipe 9, however since it is possible to improve the performance of heat radiation remarkably, by using an air cooling fan 17 in common, therefore it is applicable into the semi-conductor device of high heat generation.

An ion exchanger 16 is suitably located at a position within the display case, where the temperature is at the lowest therein. In this case, it can be considered that a portion be most suitable, in an exit portion of the tank 14, through which the liquid cooled down by means of the heat radiation pile 9 flows out, and also in the vicinity of the liquid crystal panel. This is because; the heat generation of the liquid crystal panel is very low far from that of the heat radiation pipe 9. The heat receiving jacket 8, the heat radiation pipe 9, the ion exchanger 16 and the pump 11 are connected to through a connector tube 12, and the cooling liquid enclosed in the cooling system is circulated by means of a pump 11. This connector tuber 12 is made up from a flexible tube, such as of isobutylene-isoprene rubber, etc., being able to reduce the liquid from permeation therethrough. Further, the reason of using such the tube of isobutylene-isoprene rubber lies, of course for reducing the liquid from permeation, in that it is rather easy to wind round the connector tube in the narrow space within the main-body case 1, with the flexibility thereof.

Also, in the case of the note-type personal computer, which is always opened and closed, at least the hinge portion thereof must be connected through a pipe or conduit having the flexibility; therefore the necessary condition is that it is the flexible tube.

Furthermore, the coolant enclosed within this cooling system is pure water, for example, or an anti-freezing liquid or solution, in particular when it is exposed under the environment at the freezing temperature or lower than that.

It is preferable to provide the ion exchanger 16 in a front stage of the pump, where the temperature is lowest within the system, since ion exchanger resin within the ion exchanger 16 is easily degraded through oxidation under the high temperature.

However, the ion exchanger 16 may be unified or integrated with the tank 10 or the pump 11 in one body. Into the ion exchanger resin is absorbed corrosion inhibitor (for example, benzotriazole, tolyltriazole) for the material of a copper group, in advance, and further, the corrosion inhibitor for the material of copper group is absorbed into the cooling liquid. Into the ion exchanger resin, the corrosion inhibitor is absorbed in equilibrium. If absorbing the corrosion inhibitor only into the cooling liquid at concentration being higher than a preset set value while no corrosion inhibitor into the ion exchanger resin, a portion of the corrosion inhibitor added into the cooling liquid is absorbed into the ion exchange resin, therefore it comes to be under the same liquid quality where the corrosion inhibitor is added into the cooling liquid at the preset set concentration thereof. On the contrary, it is also possible to obtain the same liquid quality by absorbing the corrosion inhibitor only into the ion exchanger resin, at the concentration being higher than the preset set value, while no corrosion inhibitor is added into the cooling liquid.

For the high heat generating CPU 7, the heat receiving jacket and heat exchanger are required to have high cooling performances. Forming fine or minute fin structure enables the heat receiving jacket to enlarge the heat conductive area thereof, thereby improving the cooling performances.

For the purpose of such the fin structure, the die-casting is preferable from viewpoints of the performances, the cost and the productivity, and aluminum is used to be the material thereof. On the other hand, for the heat radiation pipe and the heat exchanger, the heat conductive performances can be improved by attaching the heat radiation fin (i.e., of aluminum) on an outside of the heat conductive pipe thereof. Connection between the heat conductive pipe and the heat radiation fin is preferably achieved through pipe expansion (by expanding the pipe) from viewpoints of the const and the productivity thereof, and copper is used to be the material thereof. However, stainless steel, though being superior in the anticorrosive property, is inferior in the heat conductivity, comparing to copper, and further is high in rigidity, therefore being difficult to expand the pipe made thereof. Accordingly, it can be said that aluminum and copper are inevitable constituent materials, i.e., the heat receiving jacket made of aluminum, and the heat radiation pipe and the heat exchanger made of copper.

In case where aluminum and copper coexist in this manner, the copper ion dissolved from the copper accelerates the localized corrosion of aluminum, remarkably.

Figure 3:
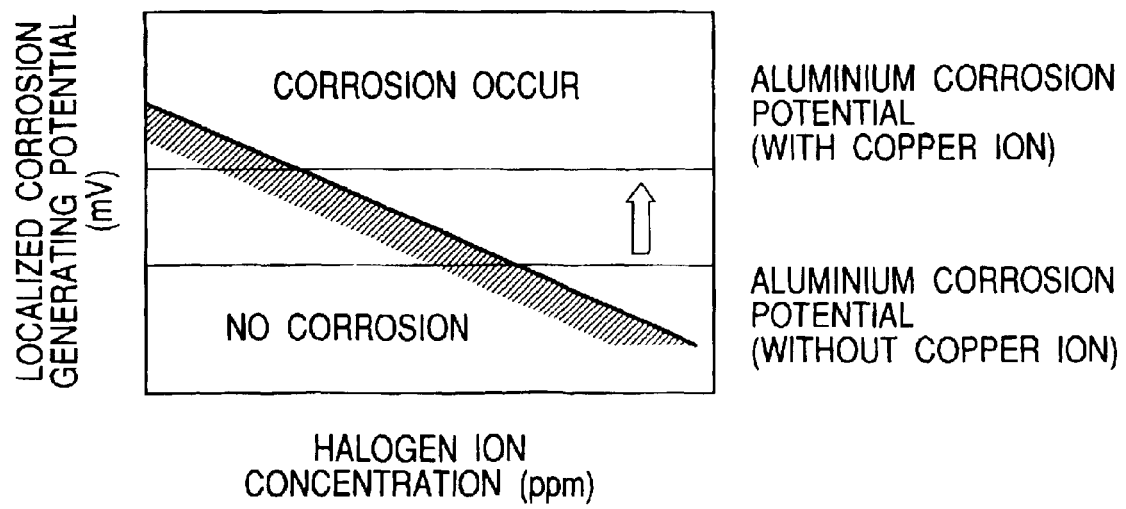
FIG. 3 is a graph for showing a relationship between the local corrosion generating potential of aluminum and the halogen ion concentration.

FIG. 3 shows a relationship between the localized corrosion generating potential of aluminum and the halogen ion concentration (such as, chlorine ion, bromine ion, etc.) in the coolant.

In FIG. 3, the localized corrosion occurs on aluminum when the corrosion potential (i.e., the potential when aluminum is dipped into the coolant) is more noble (i.e., on a side of plus potential) than the localized corrosion generating potential. In a system, in which the copper ion coexists in the coolant, since the copper ion dioxides on the surface of aluminum, the potential of aluminum is shifted to the noble side (i.e., on the side of plus potential), therefore the localized corrosion occurs on aluminum, easily. In particular, for achieving the small sizing of the cooling system, or in a case where the connector tube is adopted, being made of a material of a polymeric material group, for obtaining easy assembling, the halogen ion (such as, chlorine ion, bromine ion, etc.) is dissolved from the connector tube. As is shown in FIG. 3, the localized corrosion potential of aluminum is shifted to a base side (on a side of minus potential) as the halogen ion within the coolant comes to be high in the concentration thereof. The dissolution of the halogen ion accelerates the localized corrosion of aluminum, remarkably.

In the high heat generation semiconductor device, wherein it is essential to utilize the heat receiving jacket made of aluminum, and the heat radiation pipe and the heat exchanger, both being made of copper, it is effective to remove the halogen ion from the connector pipe made of the organic material group, as well as to reduce the dissolution of the copper ion from the heat radiation pipe and the heat exchanger made of copper, so as to inhibit the localized corrosion on the heat receiving jacket of aluminum.

Conventionally, suppression or control on the dissolution of the copper ion is achieved by adding the corrosion inhibitor both aluminum and copper, and further, the localized corrosion of aluminum by the corrosion inhibitor for aluminum. However, in a case where the cooling system is operated for a long term under the condition of free maintenance, there is provability that the corrosion resistance is reduced down due to exhaustion of the corrosion inhibitor. Then, a cooling system is required, which can maintain the corrosion resistance for a long time.

In the cooling system, according to the present invention, the ion exchanger is provided, absorbing the corrosion inhibitor for the material of the copper group into the icon exchanger resin thereof; thus, it has a means for capturing the halogen ion, and reducing the dissolution of the copper ion into the coolant, by paying an attention to the copper ion and the halogen ion, being a main factor of causing the loclized corrosion on aluminum.

From the facts that there is no definitive one as to be the corrosion inhibitor for aluminum, and that a great effect can be acknowledged on the corrosion inhibitor for copper, it is characterized that the localized corrosion can be inhibited effectively for a long time without using the corrosion inhibitor for aluminum. Also, since the copper ion, which is dissolved from the heat radiation pipe and the heat exchanger made of copper, is captured on the ion exchanger, therefore the corrosion resistance of the heat receiving jacket of aluminum can be improved furthermore. As to be the corrosion inhibitor for copper are effective the derivatives of benzotriazole, such as benzotriazole, tolyltriazole, etc., for example.

Figure 4:
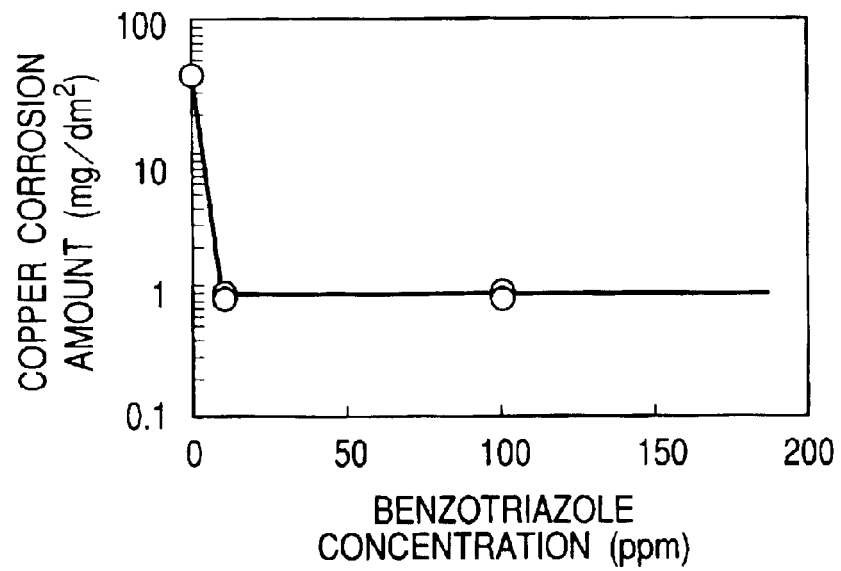
FIG. 4 is a graph for showing a relationship between an amount of corrosion of copper and the benzotriazole concentration within a cooling liquid.

FIG. 4 shows a relationship between an amount of corrosion on copper and the concentration of benzotriazole within the cooling liquid.

From FIG. 4, it can be seen that the corrosion on copper can be reduced down to be $1/50$ if adding benzotriazole to be 10 ppm or more therein, while suppressing the dissolution of the copper ion to be $1/50$. Hereinafter, description will be made on a case where the benzotriazole is added to be 50 ppm, expecting the safety therein.

Figure 5:
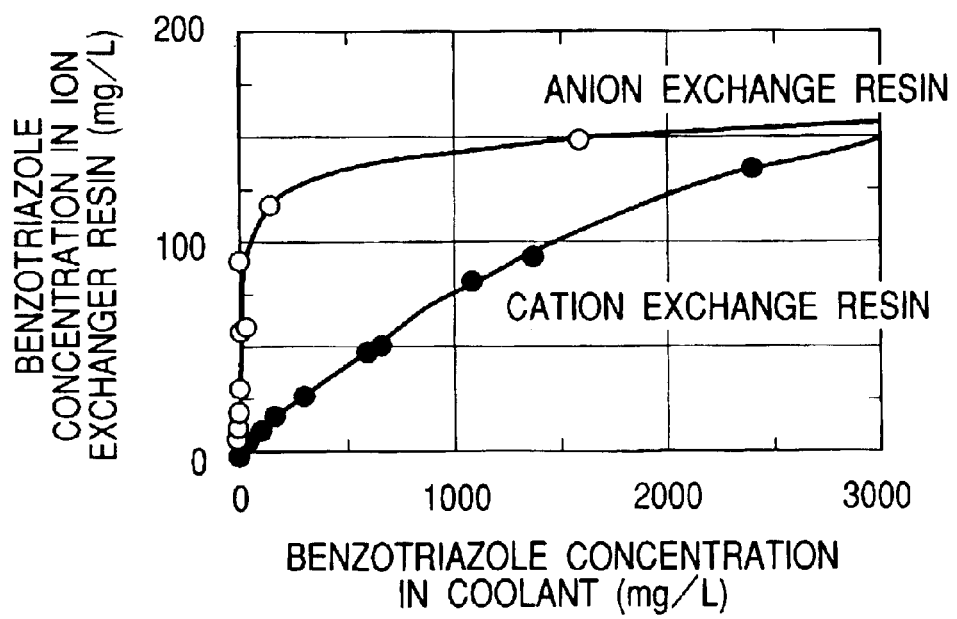
FIG. 5 is a graph for showing a relationship between the benzotriazole concentration within an ion exchange resin and the benzotriazole concentration within the coolant.

FIG. 5 shows a relationship between the concentration of benzotriazole within the ion exchanger resin and the concentration of benzotriazole within the cooling liquid.

In FIG. 5, since being ionized a little bit to cause hydrogen ion, the benzotriazole shows a weak acidity; therefore it is mainly absorbed onto an anion exchange resin. In the vicinity of 50 ppm of the benzotriazole concentration, since the absorption (i.e., reversible absorption) onto the anion exchange resin increases abruptly, the benzotriazole in the ion exchange resin is electrolytic dissociated therefrom, in spite of consumption of the benzotriazole within the cooling liquid, thereby maintaining the concentration of benzotriazole within the cooling liquid to be constant.

Figure 6:
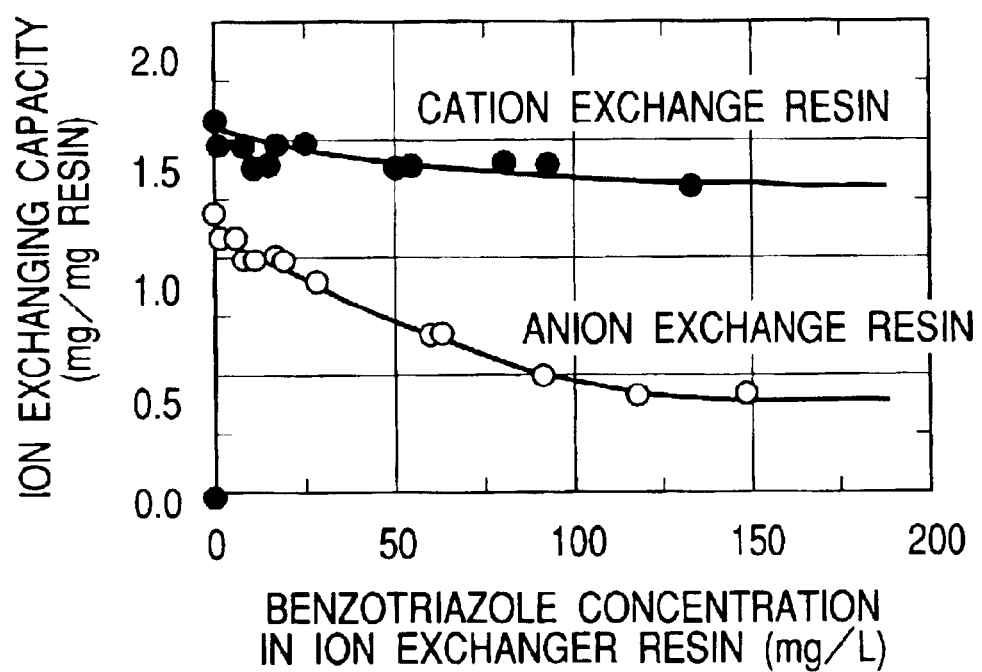
FIG. 6 is a graph for showing a relationship between an ion exchanging capacity and the benzotriazole concentration within the ion exchange resin.

FIG. 6 shows a relationship between an ion-exchanging capacity (i.e., a capacity of absorbing ion therein) and the concentration of benzotriazole within the ion exchange resin.

In FIG. 6, when benzotriazole exists in the cooling liquid at the preset set concentration, such as, 50 ppm, the concentration of benzotriazole within the ion exchanger resin is 80 mg/mg resin (the concentration of benzotriazole per 1 mg of the ion exchange resin) by an anion ion exchange resin, while 10 mg/mg resin by an cation ion exchange resin, from FIG. 5, for example. When the benzotriazole mentioned above is absorbed into the ion exchange resin, the exchanging capacity thereof is reduced by 60% for the anion exchange resin, while by 10% for the cation exchange resin, from FIG. 6, for example. Thus, it is possible to capture halogen ion to be the anion, fully or satisfactorily, even when letting the benzotriazole absorbed therein. It is also possible to make a capacity ratio of the ion exchange resin large, in advance, comparing to that of the cation exchanger resin, so as to capture the copper ion, fully or satisfactorily.

From the above, with provision of the ion exchange resin enclosed within the ion exchanger, in an amount so that it can absorb the halogen ion dissolved from the connector tube made of the polymeric material group, and also the copper ion dissolved from the heat radiation pipe and the heat exchanger made of copper, fully and satisfactorily, and further being sufficient for absorbing the benzotriazole, so as to maintain the concentration of the benzotriazole within the cooling liquid at a preset value, therefore it is possible to ascertain the corrosion resistance in the cooling system for a long term.

As was fully mentioned in the above, according to the present invention, there is obtained the cooling device for an electronic apparatus, preventing from liquid leakage due to generation of the localized corrosion on the heat receiving jacket, through dissolution of ion of heavy metal, in particular, the copper ion, and dissolution of corrosive ion from the tube made of the polymeric material group.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraced therein.

What is claimed is:

1. A cooling device for an electronic apparatus, comprising:
   a heat generating element attached within a housing;
   a heat receiving jacket, being connected with said heat-generating element;
   a first heat exchanger for exchanging heat between an outside; and
   a liquid driving means for supplying a liquid to said heat receiving jacket, wherein a part of pipework connecting between said heat receiving means, said first heat exchanger, and said liquid driving means is made from a flexible tube of resin, and further comprising,
     a second heat exchanger and an ion exchanger, which are provided in a part of said pipework,
   wherein said ion exchanger absorbs therein a corrosion inhibitor in advance, and said cooling liquid is added with a corrosion inhibitor therein.

2. A cooling device for an electronic apparatus, comprising:
   a heat generating element attached within a housing;
   a heat receiving jacket, being connected with said heat-generating element;
   a first heat exchanger for exchanging heat between an outside; and
   a liquid driving means for supplying a liquid to said heat receiving jacket, wherein a part of pipework connecting between said heat receiving means, said first heat exchanger, and said liquid driving means is made from a flexible tube of resin, and further comprising,
     a second heat exchanger and an ion exchanger, which are provided in a part of said pipework,
   wherein said heat receiving jacket is made of an aluminum group material, said second heat exchanger is made of a copper group material, said cooling liquid is an anti-freezing liquid or a pure water wherein said ion exchanger absorbs therein a corrosion inhibitor in advance, and into said cooling liquid is added a corrosion inhibitor for the copper group material.

3. A cooling device for an electronic apparatus, comprising:
   a heat generating element attached within a first housing;
   a heat receiving jacket, being connected with said heat generating element, and being attached within said first housing;
   a second housing being rotatably supported on said first housing;
   a first heat exchanger attached within said first housing, for exchanging heat between an outside; and
   a liquid driving means for supplying a cooling liquid to said heat receiving jacket, wherein a portion of a pipe for connecting between said heat receiving means, said first heat exchanger, and said liquid driving means is made of a flexible tube made of a resin, and further wherein,
     a second heat exchanger and an ion exchanger are provided in a part of said pipe, said second heat exchanger is received within said second housing, and said ion exchanger is received within said second housing, wherein said ion exchanger absorbs therein a corrosion inhibitor in advance, and said cooling liquid is added with a corrosion inhibitor therein.

4. A cooling device for an electronic apparatus, as described in the claim 3, wherein said second heat exchanger is cooled by means of a fan.

5. A cooling device for an electronic apparatus, as described in the claim 3, wherein a display device made from a liquid crystal panel is provided in said second housing, and said ion exchanger is provided on a reverse side surface of said liquid crystal panel.

* * * * *